(12) United States Patent
Murakami (10) Patent No.: US 10,594,362 B2
(45) Date of Patent: Mar. 17, 2020

(54) COMMUNICATION APPARATUS AND COMMUNICATION SYSTEM

(71) Applicant: ALPINE ELECTRONICS, INC., Ota-ku, Tokyo (JP)

(72) Inventor: Toshikatsu Murakami, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/406,485

(22) Filed: May 8, 2019

(65) Prior Publication Data

US 2019/0349025 A1 Nov. 14, 2019

(30) Foreign Application Priority Data

May 9, 2018 (JP) .................................. 2018-090855

(51) Int. Cl.
*H04B 1/74* (2006.01)
*H01Q 1/32* (2006.01)
*H01Q 1/48* (2006.01)
*H01Q 23/00* (2006.01)

(52) U.S. Cl.
CPC ............ *H04B 1/745* (2013.01); *H01Q 1/3275* (2013.01); *H01Q 1/48* (2013.01); *H01Q 23/00* (2013.01)

(58) Field of Classification Search
CPC ........ H01Q 1/3275; H01Q 1/48; H01Q 23/00; H01Q 1/00; H01Q 1/241; H01Q 1/38; H01Q 21/28; H04B 1/745
See application file for complete search history.

(56) References Cited

U.S. PATENT DOCUMENTS

| | | | |
|---|---|---|---|
| 6,275,194 B1 | 8/2001 | Ansorge | |
| 6,437,683 B1* | 8/2002 | Wolf | B60R 25/24 340/426.28 |
| 10,044,418 B2* | 8/2018 | Fikar | H04B 7/0413 |
| 2005/0258936 A1* | 11/2005 | Ghabra | B60R 25/245 340/5.72 |
| 2012/0098717 A1* | 4/2012 | Petrucci | H01Q 1/3275 343/713 |
| 2017/0373368 A1 | 12/2017 | Srirattana et al. | |
| 2018/0108961 A1* | 4/2018 | Papp | G08G 1/205 |

FOREIGN PATENT DOCUMENTS

| | | | |
|---|---|---|---|
| JP | 2004-123055 | | 4/2004 |
| JP | 02004123055 A | * | 4/2004 |
| WO | WO2017/007040 | | 1/2017 |
| WO | WO2018/072764 | | 4/2018 |

OTHER PUBLICATIONS

Extended European Search Report for 19172727.0 dated Sep. 23, 2019, 6 pgs.

* cited by examiner

*Primary Examiner* — Devan A Sandiford
(74) *Attorney, Agent, or Firm* — Brinks Gilson & Lione (57) ABSTRACT

A communication apparatus electrically connected to a first antenna through a first cable includes a second antenna that is substitutable for the first antenna; a first ground portion to which a second cable for grounding the first antenna is connected; an antenna detection circuit to detect a state of the first antenna; an antenna switching unit to switch from the first antenna to the second antenna, in a case where the antenna detection circuit detects an abnormality of the first antenna; and an insulating portion to insulate the first ground portion from a second ground portion around the first ground portion, in a case where the antenna detection circuit detects an abnormality of the first antenna.

20 Claims, 9 Drawing Sheets

COMMUNICATION APPARATUS AND COMMUNICATION SYSTEM

RELATED APPLICATION

The present application claims priority to Japanese Patent Application Number 2018-090855, filed May 9, 2018, the entirety of which is hereby incorporated by reference.

BACKGROUND

1. Field of the Invention

The present disclosure relates to a communication apparatus and a communication system.

2. Description of the Related Art

There is an increase in vehicles that are provided with a communication function to be connected to a network such as the Internet, or vehicles that transmit vehicle information and acquire information on the network by using the communication function. Vehicles that implement various services by using a communication function generally are referred to as a connected car. As one service implemented by the connected car, there is known a system in which an emergency situation is detected and is automatically reported to the police, the fire department or responsible facilities, even though a driver does not report the emergency situation by himself. Such a system is referred to as "eCall", and vehicles may be mandatorily responsible for communicating through "eCall", depending on country and region.

The name of a communication apparatus mounted on the connected car is not always the same depending on the manufacturer or the like, but the communication apparatus called a telematics control unit (TCU), a data communication module (DCM) or the like communicates with a base station of a communication company through an antenna.

A shape of the antenna used by the communication apparatus has changed from a rod antenna to a roof antenna and the like, depending on a frequency bandwidth of radio waves and along with technology development, and at present, the number of vehicles on which a shark fin antenna is mounted is increasing.

Figure 1:
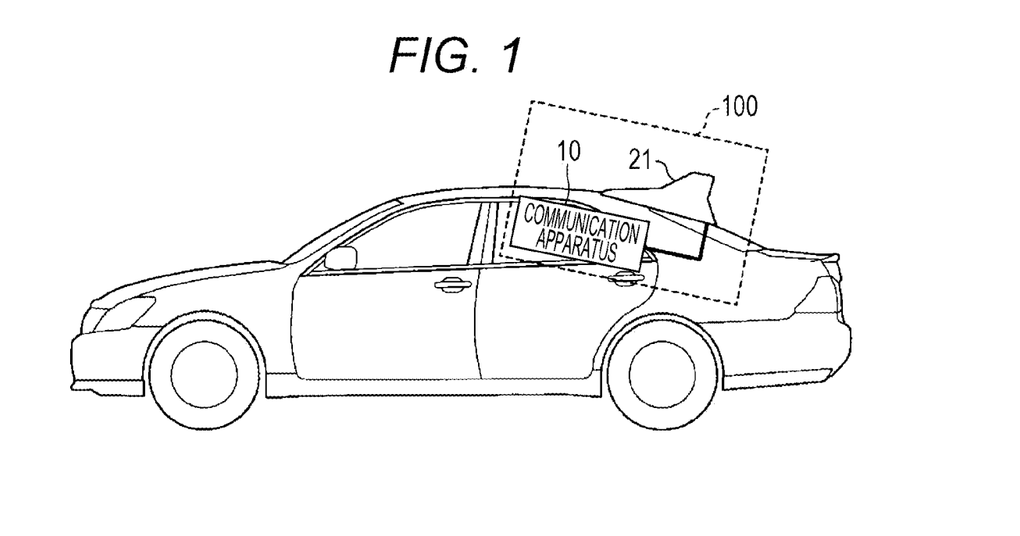
FIG. 1 illustrates an example of an external view of a shark fin antenna connected to a communication apparatus.
Figure 2:
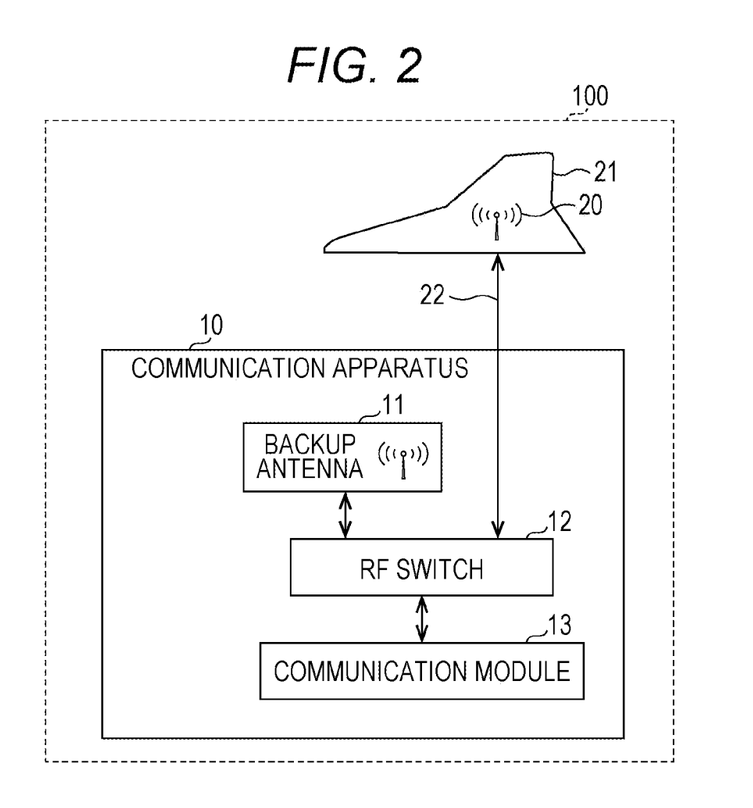
FIG. 2 is an example of a schematic configuration diagram of the communication apparatus.

FIG. 1 illustrates an example of an external view of a shark fin antenna connected to a communication apparatus, and FIG. 2 illustrates a schematic configuration diagram of the communication apparatus. A shark fin antenna 20 and a communication apparatus 10 may be collectively referred to as a communication system 100. The shark fin antenna 20 is built into a case 21 as illustrated in the drawing. In many cases, the case 21 is installed at the rear of the roof of the vehicle in consideration of the design and suppression of the height of the vehicle and the like. However, as long as the reception sensitivity of radio waves meets a standard, an installation position is not limited to the position illustrated in FIG. 1. The communication apparatus 10 is installed in the vehicle. Although the installation position of the communication apparatus 10 is also not determined, it is preferable to install the communication apparatus 10 in a place close to the shark fin antenna 20 in consideration of a length of an RF cable 22 for transmitting an electric signal to the shark fin antenna 20. Also, as the length of the RF cable 22 is shorter, it is possible to reduce the possibility of a cut-off, and it is easy to specify a cut-off position. FIG. 1 illustrates an installation in a ceiling portion of the interior of the vehicle.

Although, in "eCall", it is necessary to communicate with the outside when a large shock is applied to the vehicle, there is a possibility that an abnormality occurs in the shark fin antenna 20 or the RF cable 22 is cut off when a large shock is applied to the vehicle due to an accident or the like. For this reason, in order to enable communication even if an abnormality occurs in the shark fin antenna 20 or the RF cable 22 is cut off, as the backup unit to the shark fin antenna 20 that is a first antenna, a backup antenna (BUA) 11 that is a second antenna is built onto a printed circuit board of the communication apparatus 10.

As illustrated in FIG. 2, a communication module 13 is connected to the shark fin antenna 20 or the backup antenna 11 through an RF switch 12, but is electrically connected to only one of the shark fin antenna 20 or the backup antenna 11 by the RF switch 12 at one time. That is, the RF switch 12 switches between the shark fin antenna 20 and the backup antenna 11. Even if an abnormality occurs in the shark fin antenna 20 or the RF cable 22 is cut off, the communication apparatus 10 may be connected to the network by the backup antenna 11 (see, for example, JP 2004-123055 A). JP 2004-123055 A discloses a vehicle burglar alarm apparatus that detects a failure of an external antenna based on the electric field strength and performs switching to an internal antenna.

However, in the communication apparatus 10 of the related art, there is a problem that antenna characteristics of the backup antenna 11 deteriorate in a case where switching to the backup antenna 11 is performed. This will be described with reference to the drawings. First, in the configuration as illustrated in FIG. 2, the manufacturer of the communication apparatus 10 performs tuning of the backup antenna 11 in a state where the shark fin antenna 20 and the communication apparatus 10 are connected through a cable. Incidentally, it is more preferable to perform tuning of the backup antenna 11 on the assumption of an abnormal situation.

Figure 3:
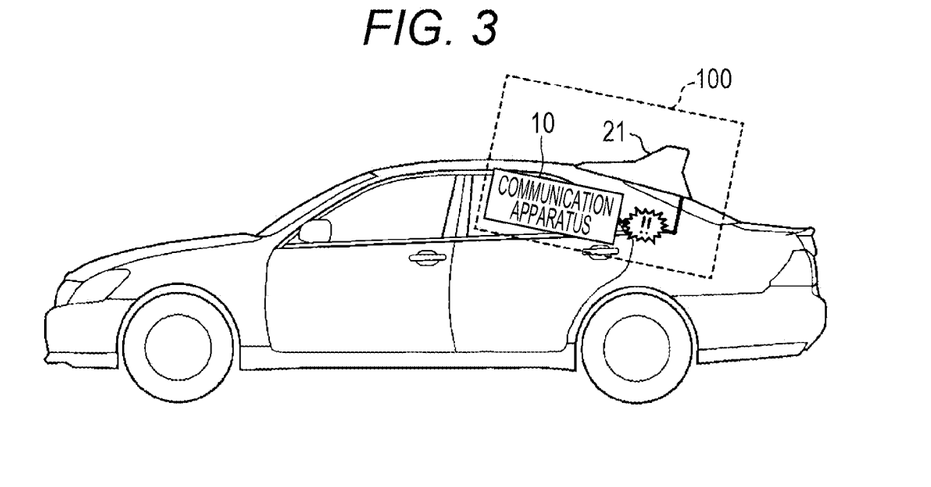
FIG. 3 illustrates an example of an external view of a shark fin antenna disconnected from the communication apparatus.
Figure 4:
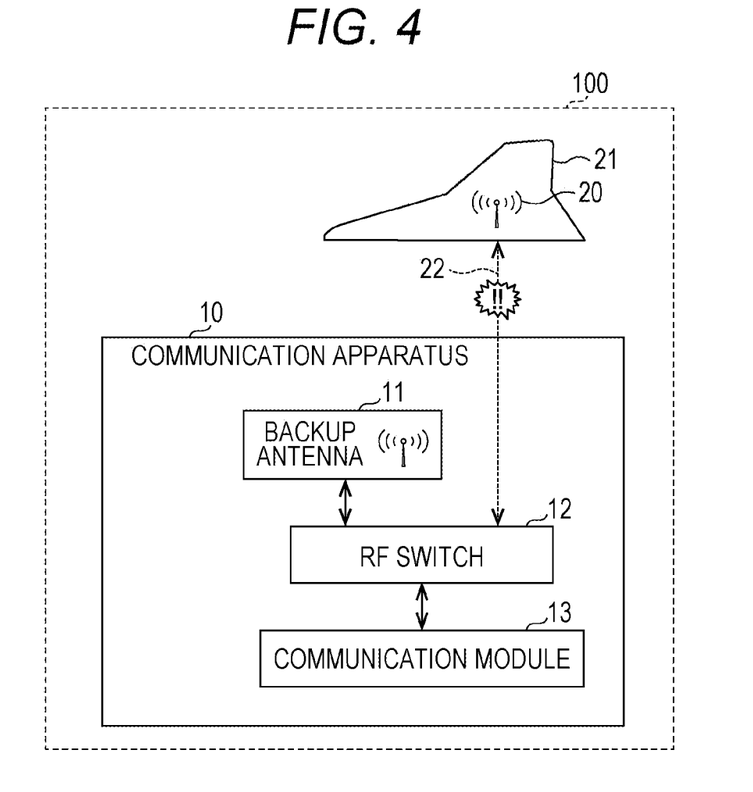
FIG. 4 is an example of a schematic configuration diagram of a communication apparatus disconnected from a shark fin antenna.

FIGS. 3 and 4 illustrate a state in which the communication apparatus 10 is difficult to perform communication using the shark fin antenna 20, because an abnormality occurs in the shark fin antenna 20 or the RF cable 22 is cut off. In a case where the communication apparatus 10 is difficult to perform communication using the shark fin antenna 20 due to an accident or the like of a vehicle, since the antenna characteristics as described above are susceptible to an influence of a peripheral metal and an electrical state becomes different from a state in tuning, there is a possibility that the performance of the backup antenna 11 is greatly degraded due to the loss of the antenna characteristics.

On the other hand, the manufacturer of the vehicle requires extremely high performance with respect to the backup antenna 11, and the manufacturer of the vehicle requires a manufacturer of the communication apparatus 10 not to degrade the performance of communication using the backup antenna 11 even if an accident or the like of a vehicle occurs.

SUMMARY

In view of the above problems, an object of the present disclosure is to provide a communication apparatus in which deterioration of the antenna characteristics of a second antenna for backup is suppressed.

In view of the above problems, according to an embodiment of the present invention, a communication apparatus electrically connected to a first antenna through a first cable includes: a second antenna configured to be substitutable for the first antenna; a first ground portion to which a second cable for grounding the first antenna is connected; an antenna detection circuit configured to detect a state of the first antenna; an antenna switching unit configured to switch from the first antenna to the second antenna, in a case where the antenna detection circuit detects an abnormality of the first antenna; and an insulating portion configured to insulate the first ground portion from a second ground portion around the first ground portion, in a case where the antenna detection circuit detects an abnormality of the first antenna.

It is possible to provide a communication apparatus in which deterioration of the antenna characteristics of the second antenna for backup is suppressed.

DETAILED DESCRIPTION OF THE PREFERRED EMBODIMENTS

Hereinafter, an embodiment for implementing the present invention will be described with reference to the drawings.
<Terms>

Electrical connection or disconnection means whether or not an electric signal (current) flows, regardless of the presence or absence of a physical contact. A state in which the electric signal (a current) flows is referred to as connection, and a state in which the electric signal (a current) does not flow is referred to as disconnection.

A state of a first antenna is referred to as a state related to communication, in which it is only necessary to estimate at least whether communication is possible or not. Also, an abnormality of the first antenna means that it is difficult to perform communication using the first antenna.

A second antenna is a backup unit (an antenna for backup) in a case where it is difficult to perform communication using the first antenna. In the present embodiment, the term "backup antenna 11" will be described.

A case where any cable is cut off may be referred to as breakage, breakdown, damage, disconnection, or the like.

Substitution means that one thing is used in place of another thing, and in the present embodiment, the term "backup" will be used. The substitution may be referred to as an alternative.
<Supplement for Communication Apparatus in the Related Art>

Figure 5A:
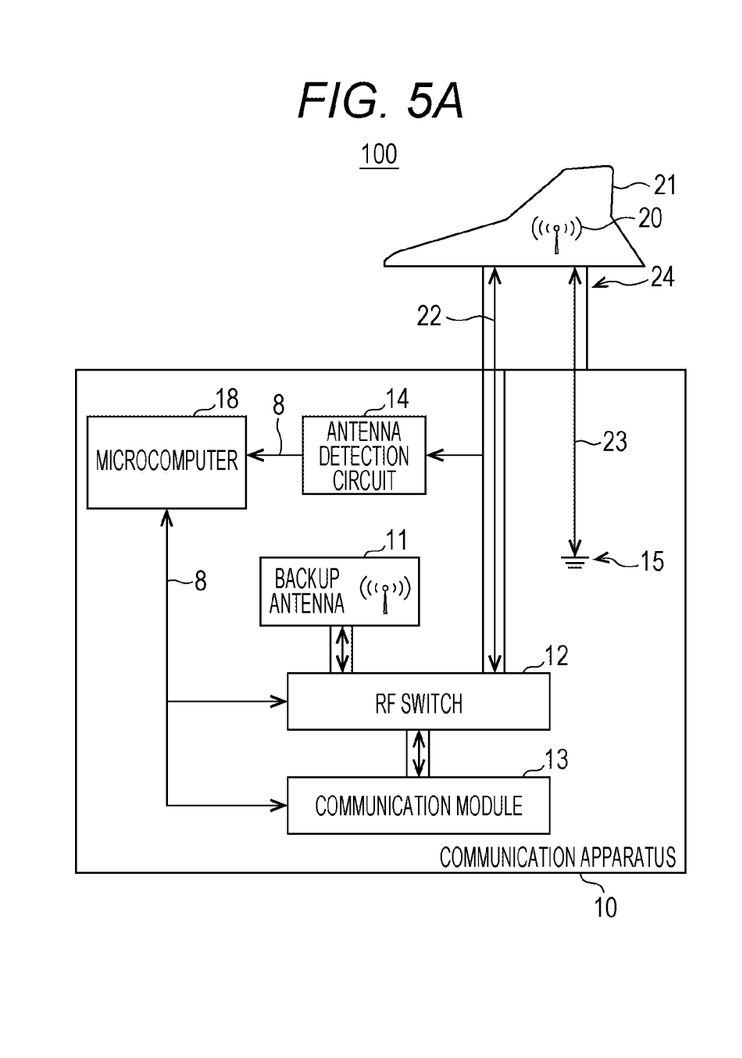
FIGS. 5A and 5B are an example of a diagram for describing the inconvenience of a communication apparatus in the related art.
Figure 5B:
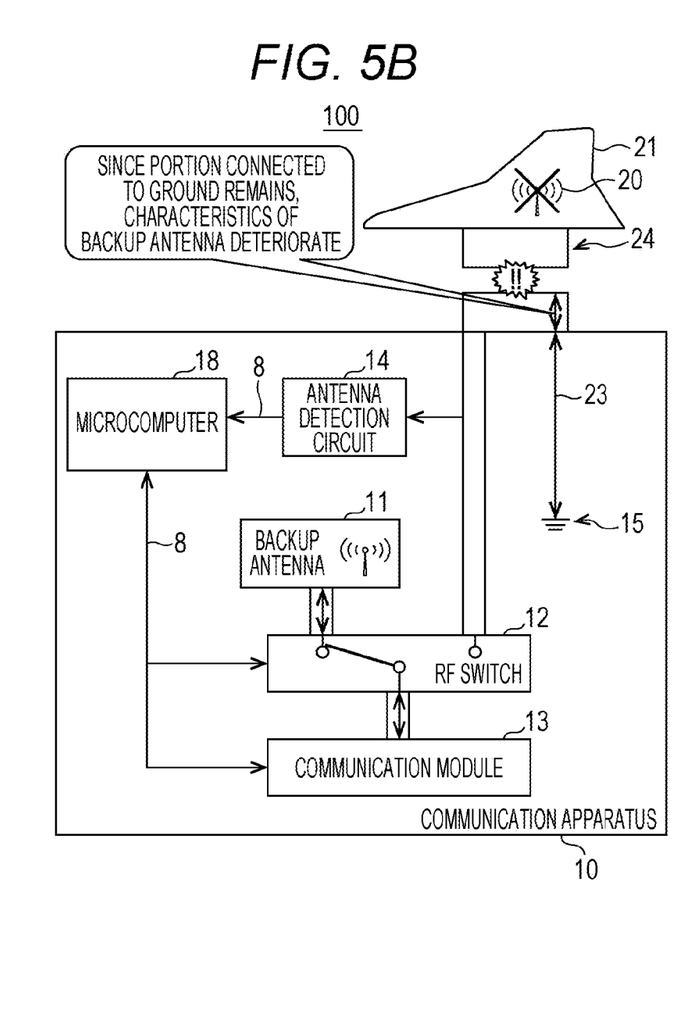

With reference to FIGS. 5A and 5B, the inconvenience related to the communication apparatus 10 in the related art will be supplementarily described. FIGS. 5A and 5B are an example of a diagram for describing the inconvenience of the communication apparatus 10 in the related art. As illustrated in FIG. 5A, the shark fin antenna 20 and the communication apparatus 10 are connected through a cable 24. Signal paths of the RF cable 22 (the first cable) and a ground cable 23 (the second cable) are secured to the cable 24, and the RF cable 22 and the ground cable 23 are respectively connected to the shark fin antenna 20.

The communication apparatus 10 has a structure in which each component is disposed on a printed circuit board and applies noise countermeasures by providing a wide ground 15. There is a case where such a ground 15 may be referred to as a solid ground pattern. Copper foil is affixed to the solid ground pattern. In FIG. 5A, a portion where no component is provided is substantially a solid ground pattern (ground 15). The RF cable 22 is connected to the shark fin antenna 20, the shark fin antenna 20 is connected to the ground cable 23, and the ground cable 23 is grounded to the ground 15. Therefore, the shark fin antenna 20 is one type of a monopole antenna using the ground, and in this way, good communication is possible with a shorter antenna than a dipole antenna.

As illustrated in FIG. 5B, there is considered a case where the cable 24 in which the signal paths of the shark fin antenna 20 and the ground cable 23 are secured is disconnected. In many cases, how the cable 24 is cut off in shock to the vehicle varies depending on how the shock occurs, but unless the cable 24 is disconnected at a boundary (connector) between the cable 24 and the communication apparatus 10, a portion of the ground cable 23 remains connected to the communication apparatus 10.

In a case where it is difficult to perform communication using the shark fin antenna 20, the communication module 13 is connected to the backup antenna 11 by the RF switch 12, so that no signal flows into the RF cable 22. However, since the backup antenna 11 is grounded to the ground 15, a portion of the ground cable 23 is continuously connected from the communication apparatus 10, so that the antenna characteristics deteriorate due to the influence of the peripheral metal (for example, a portion of the ground cable 23 operates like an antenna), and the performance of the communication of the backup antenna 11 is degraded.
<Structure of Communication Apparatus in the Present Embodiment>

In order to deal with the above inconvenience, the communication apparatus 10 of the present embodiment has a structure for insulating the ground cable 23. The structure will be described in detail with reference to FIGS. 6A and 6B.

Figure 6A:
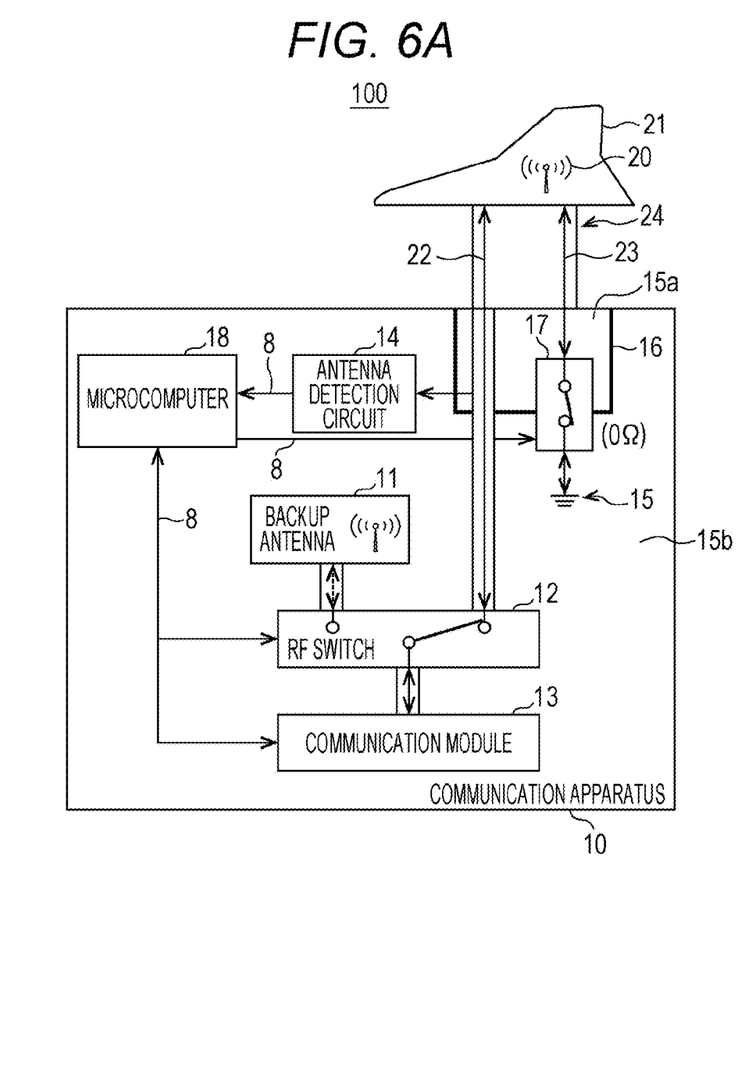
FIGS. 6A and 6B are an example of a schematic configuration diagram of a communication apparatus in the present embodiment.
Figure 6B:
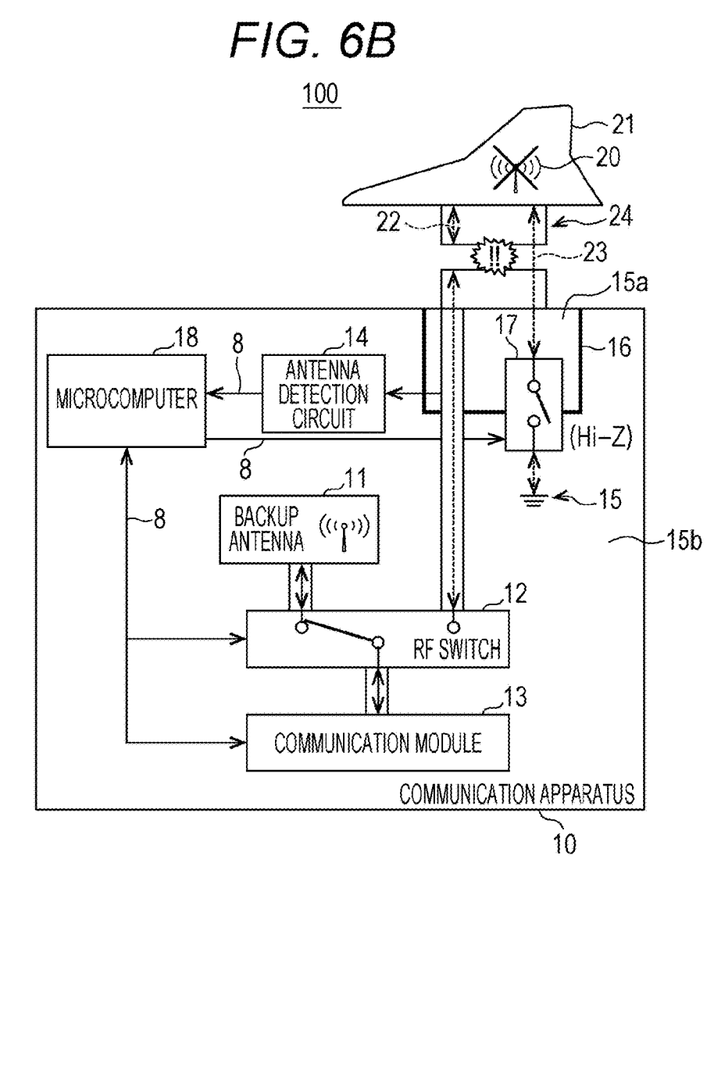

FIGS. 6A and 6B are a schematic configuration diagram of the communication apparatus 10 in the present embodiment. The shark fin antenna 20 and the communication apparatus 10 connected through the cable 24 are referred to as a communication system 100. First, FIG. 6A is a diagram for describing a state before the cable 24 is cut off. The communication apparatus 10 has a microcomputer 18, an antenna detection circuit 14, the backup antenna 11, the RF switch 12, the communication module 13, and a switch 17 between GNDs. Also, the ground 15 is separated into a first ground portion 15a and a second ground portion 15b around the first ground portion 15a through an insulating portion 16.

The microcomputer 18 functions as a controller for controlling the entire communication apparatus 10. The antenna detection circuit 14, the RF switch 12, the communication module 13, and the switch 17 between GNDs are electrically connected to the microcomputer 18. Of course, a connection line 8 between the microcomputer 18 and each component is insulated from the ground 15. The microcomputer 18 has a general configuration such as a CPU, a RAM, a ROM, and an input and output I/F. The microcomputer 18 may be referred to as a computer, an information processing apparatus, or the like.

The antenna detection circuit 14 is a circuit for detecting a state of the shark fin antenna 20.

The antenna detection circuit 14 detects whether or not an abnormality related to the possibility or impossibility of communication occurs. It is only necessary to detect the presence or absence of connection, but it may be possible to detect the performance of communication to some degree. In this embodiment, there will be described a case where the cut-off of the RF cable 22 is detected. Incidentally, if the RF cable 22 is not cut off, it may be estimated that the cable 24 including the ground cable 23 is not cut off, so that it may be considered that the antenna detection circuit 14 detects the cut-off of the cable 24 (there may be also a case where only the RF cable 22 is cut off). The antenna detection circuit 14 constantly detects a current or voltage flowing through the RF cable 22 to be output to the microcomputer 18. As a result, the microcomputer 18 detects that the RF cable 22 is not cut off, and is able to detect that no abnormality occurs in the shark fin antenna 20. Details of the antenna detection circuit 14 will be described with reference to FIG. 7.

The backup antenna 11 is an antenna through which the communication module 13 performs radio communication, and corresponds to a radio frequency including, for example, 2G, 3G, 4G such as Long Term Evolution (LTE), and the like represented by global system for mobile communications (GSM) (registered trademark). In common with the shark fin antenna 20, it is further preferable that the backup antenna 11 communicates by terrestrial waves such as radio and television, and satellite waves such as GPS.

The RF switch 12 is a switch for switching a path of the high-frequency signal (an example of the antenna switching unit). There may be also a case where the RF switch 12 is referred to as a high-frequency switch. Unlike a general switch, characteristic impedance between a communication module 13 side and an RF cable 22 side are matched in order to pass a high-frequency signal. There is a switch of a mechanical type (a high-frequency relay, a coaxial switch, and the like), or an electronic type (a PIN diode switch, an MESFET switch, an RF MEMS switch, and the like) as a system, but in the present embodiment, either one may be adopted. Generally, a switch of the electronic type is preferable because the switch is small.

The RF switch 12 switches between an on-state and an off-state in a path through which the high-frequency signal passes, in response to a control signal from the microcomputer 18. More specifically, in a case where the shark fin antenna 20 is used, a path to the shark fin antenna 20 is in the on-state and a path to the backup antenna 11 is in the off-state. In a case where the backup antenna 11 is used, the path to the backup antenna 11 is in the on-state and the path to the shark fin antenna 20 is in the off-state.

The communication module 13 performs processing related to radio communication such as 2G, 3G, and 4G such as Long Term Evolution (LTE). Upon transmission of data, the data transmitted from the microcomputer 18 is compressed by a DSP and primarily modulated, and then is secondarily modulated according to a radio system such as an FDMA, a TDMA, a CDMA, or an OFDMA. Then, the data is transmitted from the shark fin antenna 20 or the backup antenna 11. Upon transmission of an audio signal, audio data acquired by a microphone is subjected to a PCM conversion and then is modulated. Upon reception, a high-frequency radio received by the shark fin antenna 20 or the backup antenna 11 is despread according to a radio system such as an FDMA, a TDMA, a CDMA, or an OFDMA, and demodulated in the same way as the primary modulation. As a result, since digital data may be obtained, a digital signal processor (DSP) expands and restores information. The restored data is transmitted to the microcomputer 18, and the microcomputer 18 performs control according to the contents. In a case where an audio signal is received, after applying the PCM conversion to the audio signal, audio is output from a speaker through an amplifier.

The first ground portion 15a is a portion to which the cable 24 is connected, out of the solid ground pattern of the communication apparatus 10. The first ground portion 15a is provided with the solid ground pattern. On the other hand, the first ground portion 15a is insulated from the second ground portion 15b by an insulating portion 16 surrounding a rectangular region where the cable 24 is connected to the communication apparatus 10. That is, since the copper foil is not formed on the insulating portion 16, the first ground portion 15a and the second ground portion 15b are not electrically connected.

Incidentally, the shape of the first ground portion 15a does not need to be rectangular but may be semicircular or triangular. Also, the shape of the first ground portion 15a may be amorphous or polygonal. Although the size of the first ground portion 15a may be designed appropriately, it is preferable to widen the second ground portion 15b, from the viewpoint of reducing noise during communication using the backup antenna 11. Also, a width of the insulating portion 16 is sufficient as long as it is only necessary to maintain insulation.

The switch 17 between GNDs is a high-frequency switch (an RF switch) for turning on or off an electrical connection between the first ground portion 15a and the second ground portion 15b. The switch 17 between GNDs is an example of a connection state switching unit.

Since the switch 17 is a high-frequency switch, the characteristic impedance between a second ground portion 15b side and a ground cable 23 side is taken to be matched. Therefore, in a state where the switch 17 between GNDs is turned on, an impedance between the ground cable 23 and the ground 15 of the communication apparatus 10 may be regarded as substantially zero. On the contrary, in a state where the switch 17 between GNDs is turned off, the impedance between the ground cable 23 and the ground 15 of the communication apparatus 10 is infinite, or becomes large enough to be regarded as infinite.

Once the antenna detection circuit 14 detects that an abnormality occurs in the shark fin antenna 20, the microcomputer 18 controls the RF switch 12 to switch from the shark fin antenna 20 to the backup antenna 11. Also, the switch 17 between GNDs is turned off. As a result, the first ground portion 15a and the second ground portion 15b are insulated. Also, the microcomputer 18 causes the communication module 13 to transmit a notice of an emergency situation (eCall), as necessary. Incidentally, an abnormality of the shark fin antenna 20 includes a case where it is difficult to perform communication because a failure of the shark fin antenna 20 occurs while a portion or the whole of the cable 24 is connected, and a case where it is difficult to perform communication because a portion or the whole of the cable 24 is cut off.

FIG. 6B illustrates a configuration example of the communication apparatus 10 in a state where the switch 17 between GNDs is controlled to be turned off. Since an abnormality has occurred in the shark fin antenna 20 or the cable 24 has been cut off due to some causes such as an accident or the like of a vehicle, the abnormality of the shark fin antenna 20 (including cut-off of the RF cable 22) has been detected by the antenna detection circuit 14. Therefore, the microcomputer 18 controls the RF switch 12 to switch from the shark fin antenna 20 to the backup antenna 11, and also controls to turn off the switch 17 between GNDs. As a result, no current flows through the RF cable 22. Also, the second ground portion 15b and the first ground portion 15a are cut off.

For this reason, in a state of FIG. 6B, a current flowing from the printed circuit board to the ground cable 23 is greatly reduced, so that the antenna performance of the backup antenna 11 is improved, as compared with an antenna of the related art.

In FIGS. 6A and 6B, components such as a Global Positioning System (GPS) receiver and a battery, which are not directly related to the description of the present embodiment, are not illustrated. GPS makes it possible to automatically notify a network of a position of the vehicle by detecting the coordinates of the vehicle. Also, the battery enables the communication apparatus 10 to communicate with the outside, even when power is not supplied to the communication apparatus 10.

<Antenna Detection Circuit>

Figure 7:
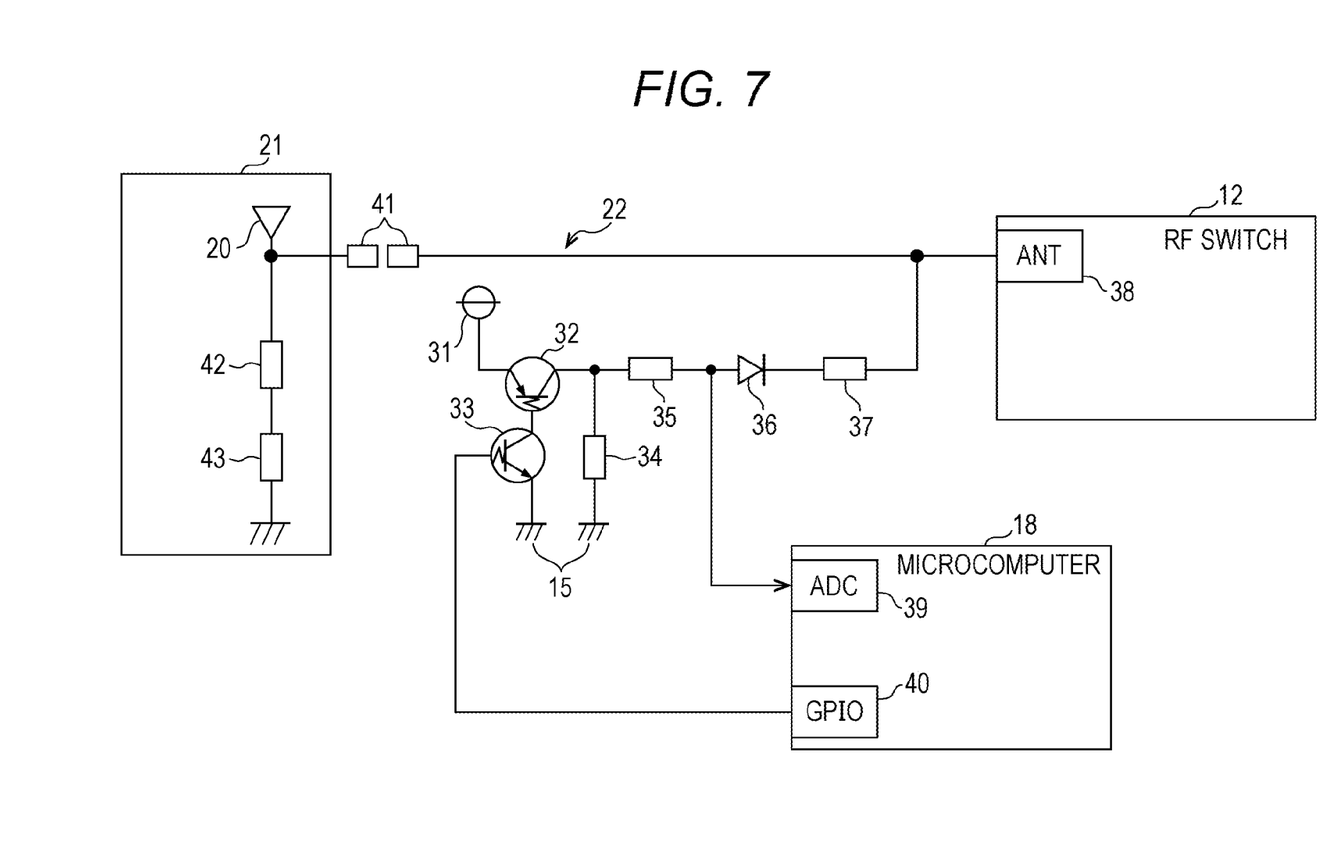
FIG. 7 is a configuration diagram of an example of an antenna detection circuit.

FIG. 7 illustrates a configuration diagram of an example of the antenna detection circuit 14. As described above, the antenna detection circuit 14 is connected to the shark fin antenna 20 and the microcomputer 18. An analog-digital controller (ADC) 39 of the microcomputer 18 and a general-purpose input and output I/F 40 are connected to the antenna detection circuit 14. Also, an antenna connection I/F 38 of the RF switch 12 is connected to the shark fin antenna 20.

When the microcomputer 18 determines whether or not there is a connection of the shark fin antenna 20 through the RF cable 22, the microcomputer 18 sets the general-purpose input and output I/F 40 to "High". As a result, a transistor 33 is turned on, and a transistor 32, to which a voltage of a power supply 31 is applied, is also turned on. A current from the power supply 31 flows through a resistor 35, a diode 36, and an RF choke coil 37 to the RF cable 22. The RF cable 22 is connected to the shark fin antenna 20 by a connector 41. Incidentally, the shark fin antenna 20 is grounded through an RF choke coil 42 and a diagnostic resistor 43.

The diode 36 is disposed to prevent a current from flowing from the RF switch 12 to the microcomputer, and the RF choke coil 37 is disposed to prevent a high frequency from flowing to the RF cable 22.

Since a voltage generated in a resistor 35 when a current from the power supply 31 flows to the RF cable 22 is divided by the resistor 34 and input to the ADC 39 of the microcomputer 18, the microcomputer 18 is able to determine whether an abnormality occurs in the shark fin antenna 20 (whether or not the RF cable 22 is cut off), depending on whether or not a predetermined voltage is detected (depending on whether or not the voltage is equal to or more than a threshold value).

In a case where an abnormality has occurred in the shark fin antenna 20, no current flows through the RF cable 22, even when the microcomputer 18 sets the general-purpose input and output I/F 40 to "High". Since a current from the power supply 31 flows to the ground through the resistor 34, a voltage of the resistor 35 becomes substantially zero. Since a voltage input to the ADC 39 is substantially zero (that is less than the threshold value), the microcomputer 18 is able to detect that an abnormality has occurred in the shark fin antenna 20 (that the RF cable 22 has been cut off).

<Functions of Microcomputer>

Figure 8:
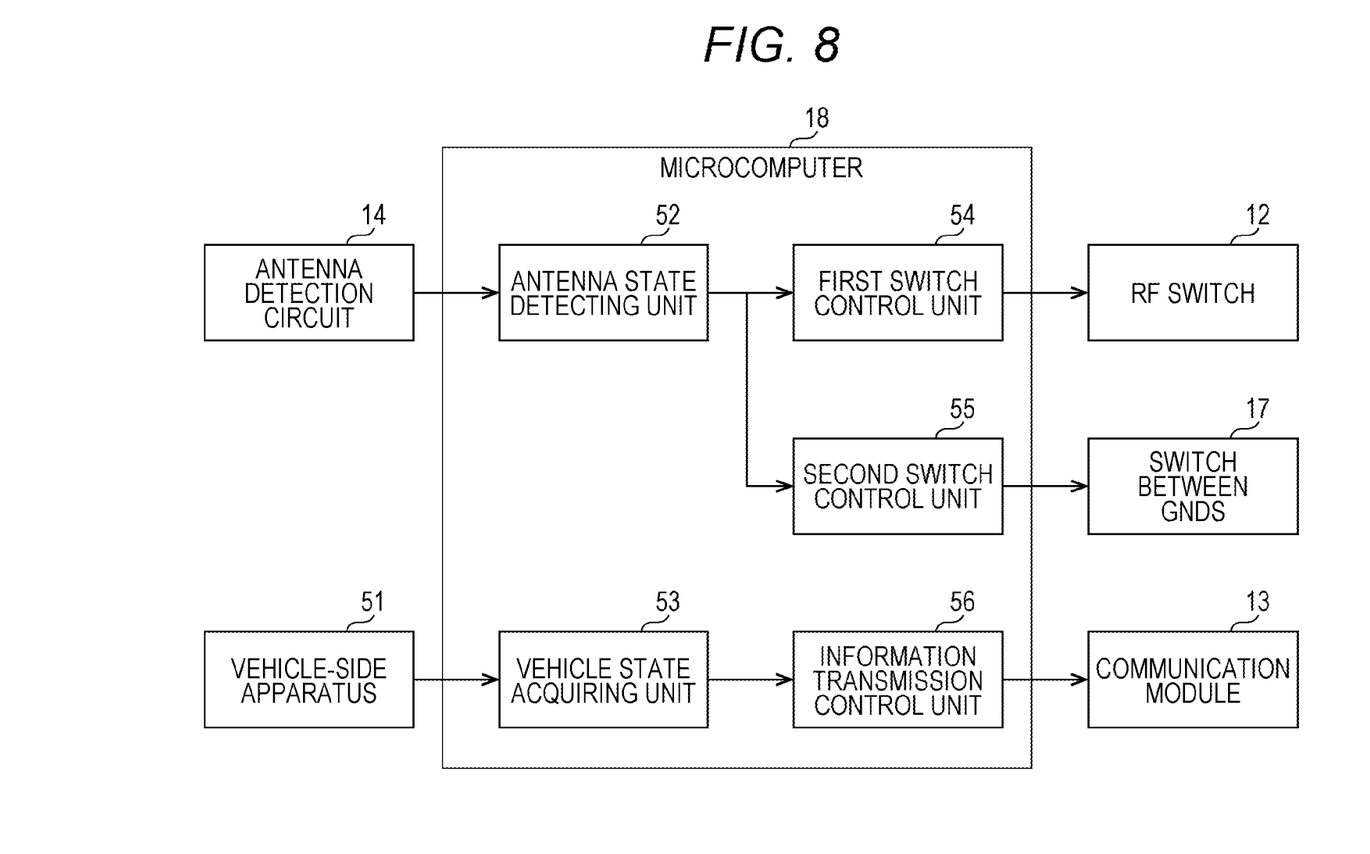
FIG. 8 is an example of a functional block diagram illustrating functions of a microcomputer.

Subsequently, the functions of the microcomputer 18 in the present embodiment will be described with reference to FIG. 8. FIG. 8 is an example of a functional block diagram illustrating the functions of the microcomputer 18. The microcomputer 18 includes an antenna state detecting unit 52, a vehicle state acquiring unit 53, a first switch control unit 54, a second switch control unit 55, and an information transmission control unit 56. Each of these functions of the microcomputer 18 is a function or a unit that is implemented by any one of the components of the microcomputer 18, such as the CPU and operated on a command from the CPU according to a program loaded from the ROM to the RAM.

First, the antenna state detecting unit 52 determines whether an abnormality has occurred in the shark fin antenna 20 through the antenna detection circuit 14 as described with reference to FIG. 7. The absence of the occurrence of an abnormality may be referred to as a connection between the RF cable 22 and the shark fin antenna 20, and the presence of the occurrence of an abnormality may be referred to as a cut-off between the RF cable 22 and the shark fin antenna 20. The result of the determination is provided to the first switch control unit 54 and the second switch control unit 55.

Once the antenna state detecting unit 52 detects an abnormality of the shark fin antenna 20, the first switch control unit 54 controls the RF switch 12. That is, a connection path from the communication module 13 to the shark fin antenna 20 is switched to a connection path from the communication module 13 to the backup antenna 11.

Once the antenna state detecting unit 52 detects an abnormality of the shark fin antenna 20, the second switch control unit 55 controls the switch 17 between GNDs. That is, the switch 17 between GNDs is controlled from an on-state to an off-state.

On the other hand, the vehicle state acquiring unit 53 acquires, from a vehicle-side apparatus 51, a notice that a predetermined or greater shock has occurred in the vehicle. The vehicle-side apparatus 51 is, for example, an Electronic Controller Unit (ECU) that detects a signal of an acceleration sensor, an airbag deployment signal, or the like and notifies the microcomputer 18 thereof. That is, the vehicle state acquiring unit 53 detects the occurrence of an emergency situation in the vehicle.

Without being limited to the shock, it may be detected that the vehicle or an article inside the vehicle is stolen. In this case, the vehicle-side apparatus 51 detects an intruder by analyzing a signal of an infrared sensor in the vehicle and an image such as a camera sensor, or detects that a vehicle or an article inside the vehicle is stolen by detecting movement of the vehicle.

Once the information transmission control unit 56 acquires, from the vehicle state acquiring unit 53, a notification that an abnormality of the vehicle, such as shock or theft, has been detected, the information transmission control unit 56 controls the communication module 13 to notify an occurrence of an emergency situation to the outside. For example, since the occurrence of an emergency situation is notified to the police, the fire department or facilities where an operator resides, a person in charge of these facilities is able to ask the driver about the safety status.

In a case where the antenna state detecting unit 52 has detected an abnormality of the shark fin antenna 20, the information transmission control unit 56 may notify the occurrence of an emergency situation to the outside. However, there is also a case where an abnormality does not occur in the shark fin antenna 20 but an emergency situation occurs. Therefore, it is preferable to separately obtain a vehicle state.

<Operation Procedure>

Figure 9:
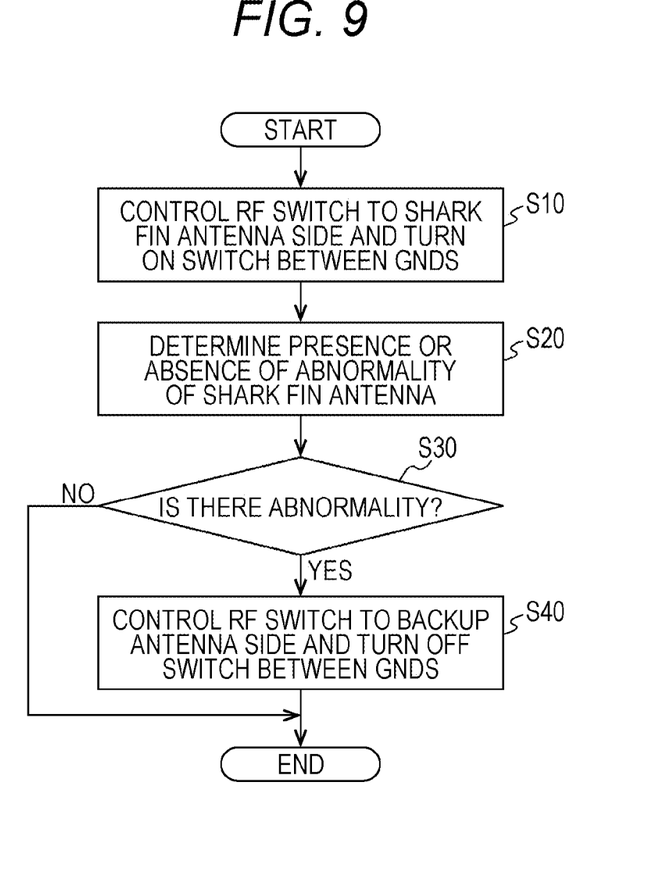
FIG. 9 is a flowchart example for generally describing operations of a microcomputer.

FIG. 9 is a flowchart of an example for generally describing the operation of the microcomputer 18. For example, it is preferable that the processing of FIG. 9 is constantly executed not only during the start-up (an IG On-state in a case where the vehicle is driven by means of an engine, and a system on-state in a case where a vehicle is driven by means of an electric motor) of the system of the vehicle but also during parking. Even if there is a person who attempts to steal a vehicle or an article in the vehicle by cutting off the shark fin antenna 20 to disable communication and making communication impossible, the communication apparatus 10 is able to notify the outside immediately after the shark fin antenna 20 is cut off.

First, as an initial setting, the first switch control unit 54 controls the RF switch 12 to connect the shark fin antenna 20 side, and the second switch control unit 55 controls to turn on the switch 17 between GNDs (S10). As a result, the RF cable 22 is in a state of being grounded to the second ground portion 15b of the communication apparatus 10 through the shark fin antenna 20.

Thereafter, the antenna state detecting unit 52 regularly determines the presence or absence of abnormality of the shark fin antenna 20 (S20). "Regularly" means, for example, every few seconds or every other minute. Instead of regular determination, irregular determination may be performed, or determination may be performed when there is a notification from the vehicle-side apparatus 51 that a suspicious vibration or an abnormality has occurred in the vehicle.

In a case where, as a result of determining the presence or absence of the abnormality of the shark fin antenna 20, no abnormality is detected ("No" in step S30), the processing is ended.

In a case where, as a result of determining the presence or absence of abnormality of the shark fin antenna 20, an abnormality is detected ("Yes" in step S30), the first switch control unit 54 controls the RF switch 12 to connect the backup antenna 11 side, and the second switch control unit 55 controls to turn off the switch 17 between GNDs (S40). As a result, no current flows from the RF cable 22 to the shark fin antenna 20. Although a portion of the ground cable 23 that has been cut off is connected to the communication apparatus 10, the second ground portion 15b and the first ground portion 15a of the communication apparatus 10 are insulated from each other, so that a state of the peripheral metal of the backup antenna 11 connected to the second ground portion 15b becomes the same as a state in tuning and it is possible to suppress degradation of the performance of the backup antenna 11.

<Example of Forming Solid Ground Pattern>

Figure 10A:
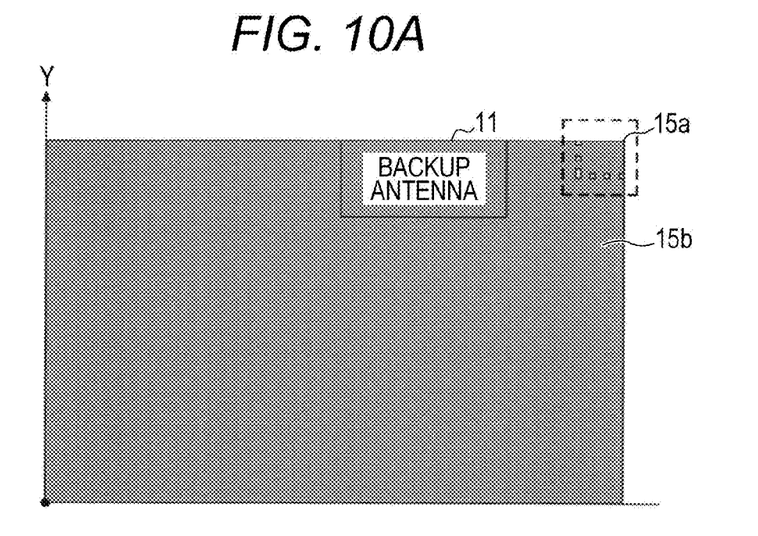
FIGS. 10A and 10B are a diagram illustrating an example of forming a solid ground pattern in a communication apparatus.
Figure 10B:
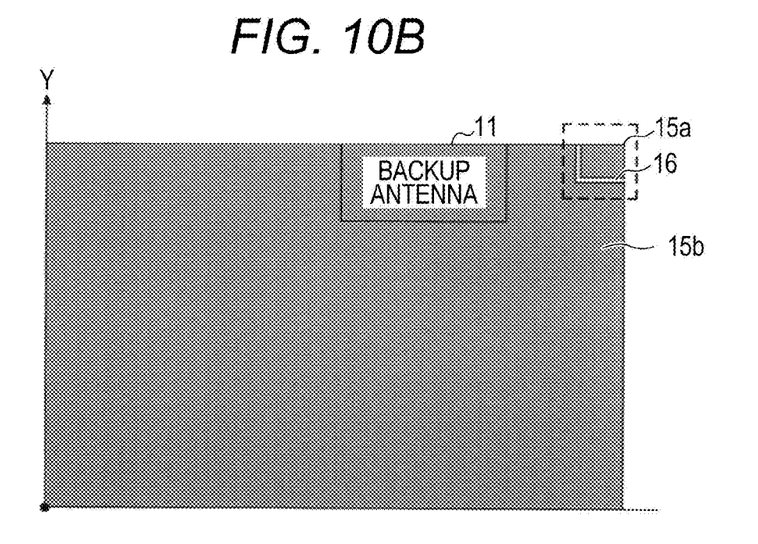

FIGS. 10A and 10B are a diagram illustrating an example of forming a solid ground pattern in the communication apparatus 10. In FIGS. 10A and 10B, other components such as the microcomputer 18 are not illustrated for convenience of description. FIG. 10A illustrates a state in which the switch 17 between GNDs is turned on, and FIG. 10B illustrates a state in which the switch 17 between GNDs is turned off, respectively. In FIG. 10B, the first ground portion 15a is completely insulated from the second ground portion 15b. Since the insulating portion 16 is a resin, the insulating portion 16 may be considered not to pass electricity.

On the other hand, in FIG. 10A, the first ground portion 15a and the second ground portion 15b are electrically connected. A fact that a connected position is not one position is based on a structure of the switch 17 between GNDs, and the first ground portion 15a and the second ground portion 15b may be electrically connected at one or more positions.

Also, the positions of the first ground portion 15a and the backup antenna 11 illustrated in FIGS. 10A and 10B are merely examples, and the positions of the first ground portion 15a and the backup antenna 11 may be determined as appropriate. For example, it is determined to be advantageous to a wiring length of the connection line, a noise and reception sensitivity.

<Configuration in Tuning>

Figure 11:
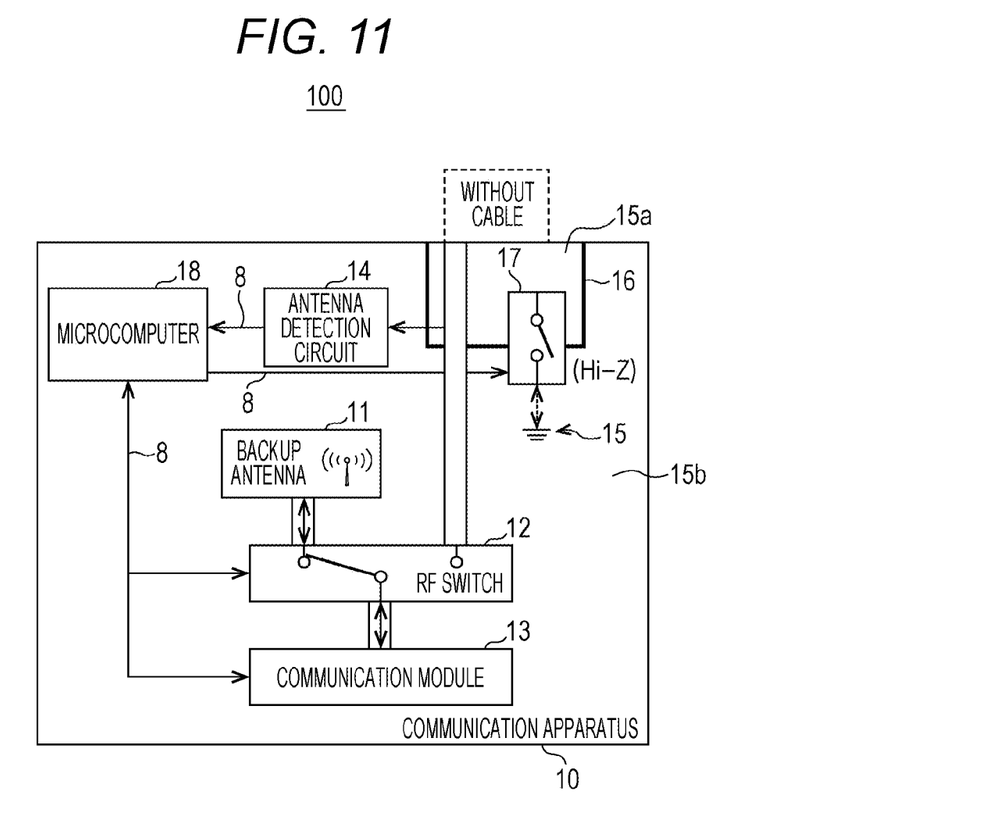
FIG. 11 is an example of a diagram for describing a state of a communication apparatus in tuning for a backup antenna.

The configuration of the communication apparatus 10 in tuning of the backup antenna 11 will be described with reference to FIG. 11. FIG. 11 is an example of a diagram for describing the state of the communication apparatus 10 in tuning of the backup antenna 11. In the communication apparatus 10 of FIG. 11, neither the cable 24 nor the shark fin antenna 20 is connected to the communication apparatus 10.

That is, in the communication apparatus 10 of the present embodiment, tuning of the backup antenna 11 is performed in a state where there is no connection to the cable 24. The RF switch 12 is naturally connected to a backup antenna 11 side. Also, the switch 17 between GNDs is turned off. Since there is no connection to the cable 24, the switch 17 between GNDs may be turned on. However, since a shape of the ground 15 is changed as the switch 17 between GNDs is turned on or off, there is a possibility that the performance of the backup antenna 11 is changed. Therefore, assuming that an abnormality occurs in the shark fin antenna 20 due to an accident or the like of a vehicle, it is preferable that tuning is performed in a state where the switch 17 between GNDs is turned off in the same way as in this situation.

Incidentally, tuning means that the manufacturer adjusts a length, a shape, a disposed position, and the like of the backup antenna 11 such that the performance of the backup antenna 11 satisfies the standard. There are various methods of tuning, but at present, there is used a method of measuring impedance characteristics while utilizing computer simulation or utilizing a Smith chart (which may be on sheet or computer screen).

<Effects>

When the cable 24 (the shark fin antenna 20 and the ground cable 23) is cut off, the applicant has simulated radiation efficiency with respect to the radio frequency of the backup antenna 11 of the communication apparatus 10 in the related art without the switch 17 between GNDs and radiation efficiency with respect to the radio frequency of the backup antenna 11 of the communication apparatus 10 with the switch 17 between GNDs being turned off. Incidentally, it is assumed that the ground cable 23 having a predetermined length is electrically connected to the communication apparatus 10 (in a situation where a cut end portion remains). According to the result of simulation, the switch 17 between GNDs is turned off, so that the characteristic change is minimized before and after the cable 24 is cut off. Thus, in the communication apparatus 10 of the present embodiment, a performance improvement of several tens percentage or more is recognized.

Also, according to the communication apparatus 10 of the present embodiment, there is an effect that it is possible to reduce a workload in tuning. In a case where the present embodiment is not applied, it is necessary to perform effective tuning for a failure mode in consideration of the failure mode (such as a cut position of the cable 24). That is, since actual failure modes (such as a cut position of the cable 24) exist almost indefinitely, it is necessary to additionally examine "which state tuning is most effective?". For example, in a case where the cable 24 is cut off at a position 3 cm from the connector end of the communication apparatus 10, in a case where the cable 24 is cut off at a position of 4 cm therefrom, and in a case where the cable 24 is cut off at a position of 5 cm therefrom, and so on, the cut position of the cable 24 is difficult to be determined in advance. For this reason, it is necessary to perform a number of tunings or to perform tuning assuming the cut position of the cable 24.

Even in a case where the connected position of the shark fin antenna 20 and the length of the cable 24 are different for each type of vehicle, the communication apparatus 10 of the present embodiment is able to perform tuning by minimizing the influence of these differences. That is, a state of a product to be tuned is obvious, so that it is possible to reduce the number of steps for examination.

<Other Application Examples>

Although the best mode for carrying out the invention has been described with examples, the present invention is not limited to these examples.

For example, although the example in which the communication apparatus 10 and the shark fin antenna 20 are mounted on a vehicle has been described in the present embodiment, the communication apparatus 10 and the shark fin antenna 20 may be mounted on a moving body other than the vehicle. For example, the communication apparatus 10 and the shark fin antenna 20 may be mounted on two-wheeled vehicles (bicycles and motorcycles), wheelchairs, small vehicles, mobility for one-seater or two-seaters, robots and the like. There is a low possibility that the cable is cut off unless it is a moving body, but it is possible to mount the communication apparatus 10 and the shark fin antenna 20 on a non-moving body as well.

In the present embodiment, the shark fin antenna 20 is merely described as an example of the antenna, and a shape of the antenna, a shape of the case of the antenna, a material of the antenna or case, or a name of the antenna is not particularly limited and may be applied to the communication apparatus 10 of the present embodiment. The shark fin antenna 20 may also be referred to as a dolphin antenna or any other name. The shark fin antenna 20 also does not need to be installed on the roof, and may be disposed anywhere on a bumper or the like.

The backup antenna 11 is generally installed on the printed circuit board, but the backup antenna 11 may be connected to the communication apparatus 10 through a cable. In this case, preferably, the cable is configured to be hardly cut off such that the cable is extended to the inside of the vehicle.

In a case where the printed circuit board has a multilayer structure, it is not necessary to dispose the first ground portion 15*a* and the second ground portion 15*b* in the same layer. The switch 17 between GNDs is not limited to the RF switch, and a simple switch may be used as long as the electrical disconnection and connection may be switched.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A communication apparatus electrically connected to a first antenna through a first cable, comprising:
   a second antenna configured to be substitutable for the first antenna;
   a first ground portion to which a second cable for grounding the first antenna is connected;
   an antenna detection circuit configured to detect a state of the first antenna;
   an antenna switching unit configured to switch from the first antenna to the second antenna, in a case where the antenna detection circuit detects an abnormality of the first antenna; and
   an insulating portion configured to insulate the first ground portion from a second ground portion around the first ground portion, in a case where the antenna detection circuit detects an abnormality of the first antenna.

2. The communication apparatus according to claim 1, further comprising:
   a connection state switching unit configured to switch between a state in which the first ground portion and the second ground portion are electrically connected and a state in which the first ground portion and the second ground portion are electrically disconnected,
   wherein the connection state switching unit electrically connects the first ground portion and the second ground portion until the antenna detection circuit detects an abnormality of the first antenna, and
   electrically disconnects the first ground portion and the second ground portion, in a case where the antenna detection circuit detects an abnormality of the first antenna.

3. The communication apparatus according to claim 2,
   wherein the second antenna is grounded to the second ground portion,
   the tuning of the second antenna is performed in a state where the first ground portion and the second ground portion are electrically disconnected by the connection state switching unit, and
   in a case where the antenna detection circuit detects an abnormality of the first antenna, the first ground portion and the second ground portion are electrically disconnected such that communication using the second antenna is performed in a state of the peripheral metal, which is the same as a state in tuning.

4. The communication apparatus according to claim 3, wherein the antenna detection circuit detects a cut-off of the first cable.

5. The communication apparatus according to claim 4, wherein the first antenna is a shark fin antenna.

6. The communication apparatus according to claim 2, wherein the antenna detection circuit detects a cut-off of the first cable.

7. The communication apparatus according to claim 6, wherein the first antenna is a shark fin antenna.

8. The communication apparatus according to claim 1, wherein the antenna detection circuit detects a cut-off of the first cable.

9. The communication apparatus according to claim 8, wherein the first antenna is a shark fin antenna.

10. A communication system in which a first antenna and a communication apparatus are electrically connected through a first cable, comprising:
a second antenna configured to be substitutable for the first antenna;
a first ground portion to which a second cable for grounding the first antenna is connected;
an antenna detection circuit configured to detect a state of the first antenna;
an antenna switching unit configured to switch from the first antenna to the second antenna, in a case where the antenna detection circuit detects an abnormality of the first antenna; and
an insulating portion configured to insulate the first ground portion from a second ground portion around the first ground portion, in a case where the antenna detection circuit detects an abnormality of the first antenna.

11. The communication system according to claim 10, further comprising:
a connection state switching unit configured to switch between a state in which the first ground portion and the second ground portion are electrically connected and a state in which the first ground portion and the second ground portion are electrically disconnected,
wherein the connection state switching unit electrically connects the first ground portion and the second ground portion until the antenna detection circuit detects an abnormality of the first antenna, and
electrically disconnects the first ground portion and the second ground portion, in a case where the antenna detection circuit detects an abnormality of the first antenna.

12. The communication system according to claim 11, wherein the second antenna is grounded to the second ground portion,
the tuning of the second antenna is performed in a state where the first ground portion and the second ground portion are electrically disconnected by the connection state switching unit, and
in a case where the antenna detection circuit detects an abnormality of the first antenna, the first ground portion and the second ground portion are electrically disconnected such that communication using the second antenna is performed in a state of the peripheral metal, which is the same as a state in tuning.

13. The communication system according to claim 12, wherein the antenna detection circuit detects a cut-off of the first cable.

14. The communication system according to claim 13, wherein the first antenna is a shark fin antenna.

15. The communication system according to claim 10, wherein the antenna detection circuit detects a cut-off of the first cable.

16. A communication apparatus electrically connected to a first antenna through a first cable, comprising:
a second antenna;
a first ground portion to which a second cable for grounding the first antenna is connected;
a second ground portion for grounding the second antenna, where the second ground portion is insulated from the first ground portion;
an antenna detection circuit configured to detect a state of the first antenna;
an antenna switching unit configured to switch from the first antenna to the second antenna, in a case where the antenna detection circuit detects an abnormality of the first antenna; and
a connection state switching unit configured to switch between a state in which the first ground portion and the second ground portion are electrically connected and a state in which the first ground portion and the second ground portion are electrically disconnected.

17. The communication apparatus according to claim 16, wherein the connection state switching unit electrically connects the first ground portion and the second ground portion until the antenna detection circuit detects an abnormality of the first antenna, and electrically disconnects the first ground portion and the second ground portion, in a case where the antenna detection circuit detects an abnormality of the first antenna.

18. The communication apparatus according to claim 17, wherein the tuning of the second antenna is performed in a state where the first ground portion and the second ground portion are electrically disconnected by the connection state switching unit, and
in a case where the antenna detection circuit detects an abnormality of the first antenna, the first ground portion and the second ground portion are electrically disconnected such that communication using the second antenna is performed in a state of the peripheral metal, which is the same as a state in tuning.

19. The communication apparatus according to claim 18, wherein the antenna detection circuit detects a cut-off of the first cable.

20. The communication apparatus according to claim 19, wherein the first antenna is a shark fin antenna.

* * * * *